US011100146B1

(12) United States Patent
Brest et al.

(10) Patent No.: US 11,100,146 B1
(45) Date of Patent: Aug. 24, 2021

(54) SYSTEM MANAGEMENT USING NATURAL LANGUAGE STATEMENTS

(71) Applicant: Amazon Technologies, Inc., Seattle, WA (US)

(72) Inventors: Jordan Barry Brest, San Jose, CA (US); Gunja Agrawal, Mountain View, CA (US); Rahul Sharma, Mountain View, CA (US); Venkata Keerthana Atchutuni, Sunnyvale, CA (US); Vijay Dheeraj Reddy Mandadi, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 218 days.

(21) Appl. No.: 15/933,849

(22) Filed: Mar. 23, 2018

(51) Int. Cl.
| | |
|---|---|
| *G06F 16/332* | (2019.01) |
| *G06F 21/32* | (2013.01) |
| *G06F 16/2457* | (2019.01) |
| *G06F 40/205* | (2020.01) |

(52) U.S. Cl.
CPC .... *G06F 16/3329* (2019.01); *G06F 16/24578* (2019.01); *G06F 21/32* (2013.01); *G06F 40/205* (2020.01)

(58) Field of Classification Search
CPC ...... G06F 3/167; G06F 1/1605; G06F 1/1643; G06F 3/0412; G10L 15/22; H04M 1/72533; H04R 1/083; H04R 27/00
USPC ........................................................ 704/275
See application file for complete search history.

(56) References Cited

U.S. PATENT DOCUMENTS

| | | | | |
|---|---|---|---|---|
| 8,660,849 B2* | 2/2014 | Gruber | ................... | G06F 3/167 |
| | | | | 704/275 |
| 8,942,985 B2* | 1/2015 | Mowatt | ................... | G10L 15/18 |
| | | | | 704/275 |
| 9,245,521 B2* | 1/2016 | Park | ........................ | G10L 15/01 |
| 9,392,326 B2* | 7/2016 | Lee | .................... | H04N 5/44513 |
| 9,575,963 B2* | 2/2017 | Pasupalak | ............... | G10L 15/30 |
| 10,235,130 B2* | 3/2019 | Bai | ........................ | G06F 40/40 |
| 10,255,921 B2* | 4/2019 | Elson | .................. | G06F 16/3329 |
| 10,360,902 B2* | 7/2019 | Hornkvist | ......... | G06F 16/24532 |

(Continued)

OTHER PUBLICATIONS

Amazon Web Services, Inc., Documentation, Developer Guide, "What Is Amazon Lex?," 3 pages, 2018.

*Primary Examiner* — Mohammad K Islam
(74) *Attorney, Agent, or Firm* — Klarquist Sparkman, LLP

(57) ABSTRACT

Technologies are provided for managing computer system resources using natural language statements. A natural language statement can be received from a user computing device by a management service. The natural language statement can be analyzed to identify an executable command, and the command can be executed against one or more system resources. If the system resources are located in separate computing environments, different operations can be used to target the system resources in the separate computing environments. A script repository can be searched to identify an executable script containing the command referenced by the received natural language statement. A message can be transmitted to the user device, recommending execution of the identified script. In a different or further embodiment, if a given user is not authorized to execute a given command or script, a request for authorization can be sent to a supervisor of the given user.

17 Claims, 9 Drawing Sheets

(56) References Cited

U.S. PATENT DOCUMENTS

| | | | | |
|---|---|---|---|---|
| 10,490,195 B1* | 11/2019 | Krishnamoorthy | | G10L 13/00 |
| 10,546,580 B2* | 1/2020 | Friedman | | G10L 15/26 |
| 10,803,854 B1* | 10/2020 | Danovitz | | G06F 16/907 |
| 10,817,787 B1* | 10/2020 | Zhang | | G06F 40/284 |
| 2009/0307671 A1* | 12/2009 | White | | A63F 13/10 |
| | | | | 717/149 |
| 2015/0181014 A1* | 6/2015 | Gerhardt | | G07C 9/00309 |
| | | | | 455/420 |
| 2015/0212791 A1* | 7/2015 | Kumar | | G06F 3/167 |
| | | | | 715/728 |
| 2015/0370319 A1* | 12/2015 | Alleaume | | G06F 3/167 |
| | | | | 345/156 |
| 2016/0042735 A1* | 2/2016 | Vibbert | | G10L 15/1822 |
| | | | | 704/257 |
| 2016/0062467 A1* | 3/2016 | Buxton | | G06F 3/0482 |
| | | | | 345/173 |
| 2016/0078868 A1* | 3/2016 | Landry | | G06F 3/167 |
| | | | | 704/9 |
| 2016/0098992 A1* | 4/2016 | Renard | | G10L 15/18 |
| | | | | 704/275 |
| 2016/0259525 A1* | 9/2016 | Li | | G06F 3/04817 |
| 2016/0358603 A1* | 12/2016 | Azam | | G10L 15/22 |
| 2017/0024378 A1* | 1/2017 | Sharma | | G06F 3/017 |
| 2017/0357638 A1* | 12/2017 | Schlesinger | | G10L 15/22 |
| 2018/0039478 A1* | 2/2018 | Sung | | G06F 3/167 |
| 2018/0144615 A1* | 5/2018 | Kinney | | G06K 9/00362 |
| 2018/0373494 A1* | 12/2018 | Loughrey | | G06F 3/167 |
| 2019/0043472 A1* | 2/2019 | Garcia | | G10L 21/003 |
| 2019/0087870 A1* | 3/2019 | Gardyne | | H04N 21/812 |
| 2019/0103101 A1* | 4/2019 | Danila | | G10L 25/51 |
| 2019/0295532 A1* | 9/2019 | Ammedick | | G06F 9/445 |
| 2019/0295538 A1* | 9/2019 | Mese | | G10L 15/22 |
| 2019/0371327 A1* | 12/2019 | Quinn | | G06F 3/017 |
| 2019/0371330 A1* | 12/2019 | Lin | | G10L 25/84 |
| 2019/0378510 A1* | 12/2019 | Danila | | G06F 40/35 |
| 2020/0160856 A1* | 5/2020 | Kline | | G06F 3/167 |
| 2020/0302925 A1* | 9/2020 | Shah | | G10L 15/22 |
| 2021/0099767 A1* | 4/2021 | Wilde | | G06F 16/338 |

* cited by examiner

SYSTEM MANAGEMENT USING NATURAL LANGUAGE STATEMENTS

BACKGROUND

Traditionally, many organizations have maintained their information technology (IT) resources in on-premises facilities and/or dedicated data centers. However, in recent years at least some organizations have begun to move IT resources into cloud computing environments. In at least some cases, organizations are unable (or unwilling) to move all of their IT resources into the cloud. Such organizations can find themselves managing a hybrid infrastructure, where some system resources are maintained in a cloud computing environment, while other system resources remain in on-premises facilities and/or dedicated data centers. Managing such hybrid infrastructures can require proficiency with, and access to, multiple, disparate computing environments.

DETAILED DESCRIPTION

Figure 1:
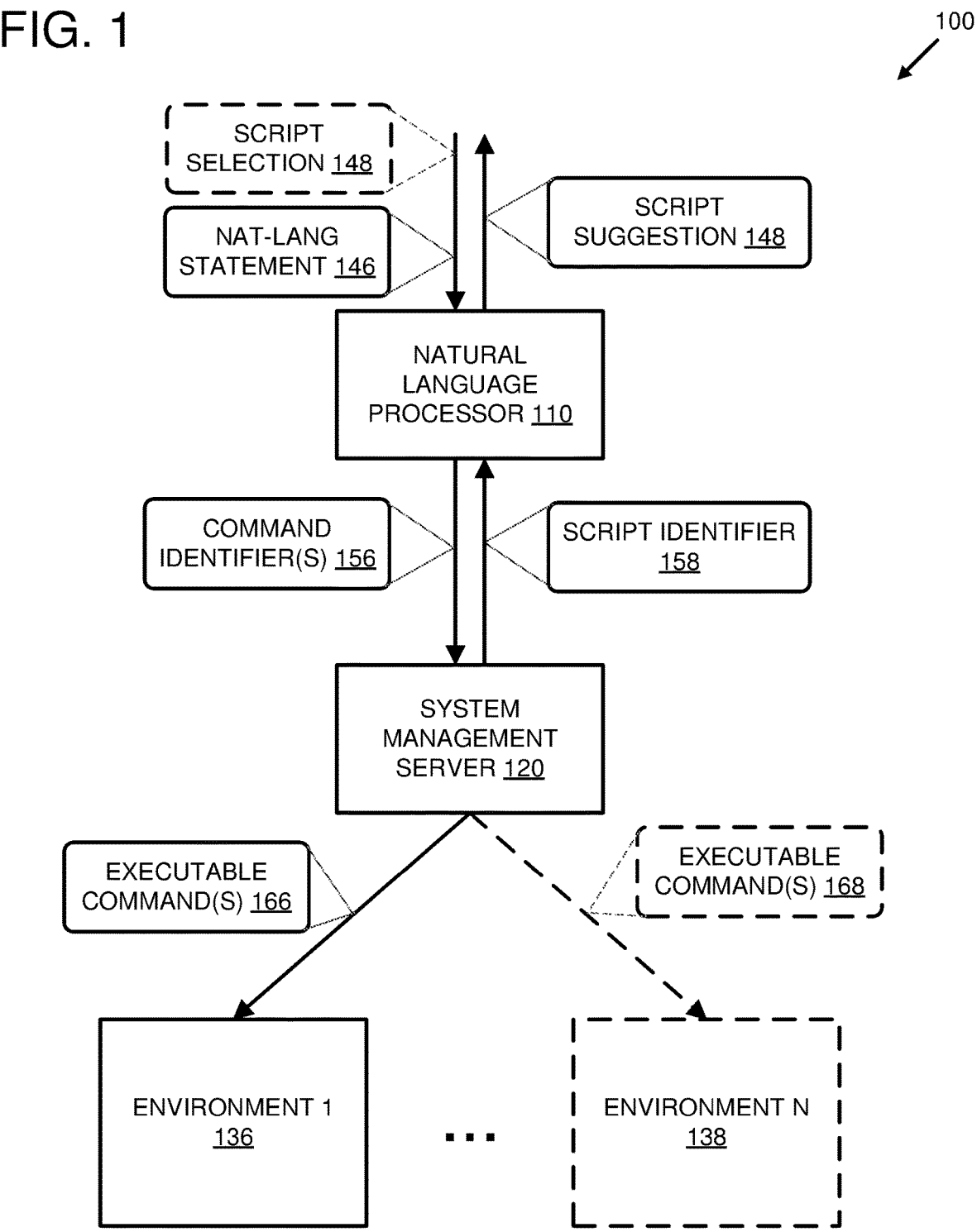
FIG. 1 is a system diagram depicting an example system configured to identify executable scripts based on natural language statements.

As an organization transitions system resources from on-premises facilities to external computing environments (such as cloud computing environments), monitoring system resources and diagnosing system issues can become increasingly complex. For example, in hybrid infrastructures, where system resources are spread across multiple computing environments (and potentially multiple computer networks), investigating and diagnosing system issues can be a time-consuming, and sometimes computationally expensive, endeavor. Many disparate computing environments may have to be queried using different command interfaces, and possibly requiring different security protocols. Obtaining actionable information about the overall system, spread across the multiple computing environments, can be an arduous process. The impact of this delay may be exacerbated by the fact that, in many cases, such overall system insight is needed to address critical system failures that demand quick reactions.

At least some of the embodiments of the technologies described herein can address this problem by enabling the management of system resources using natural language statements. For example, a management service can be configured to receive a natural language statement from a user computing device. The management service can be configured to analyze the natural language statement to identify one or more executable commands referenced by the natural language statement. The management service can identify one or more system resources targeted by the one or more executable commands, and execute the commands against the identified system resources. In scenarios where the identified system resources are located in multiple computing environments, the management service can be configured to detect this and to perform separate operations targeting the system resources in the separate computing environments. In at least some cases, such operations can comprise transmitting requests using separate command interfaces, application programming interfaces (API's), security protocols, and/or networking protocols. In at least some embodiments, a response to the processing of the identified one or more commands can be transmitted to the user computing device. In some such embodiments, a conversational interface can be provided wherein subsequent natural language statements can be provided by the user computing device and processed by the management service, resulting in subsequent responses.

In a different or further embodiment, a script repository can be searched to identify an executable script containing an executable command referenced by a received natural language statement. A message can be transmitted to the user device, recommending execution of the identified script. If a subsequent message is received from the user device, indicating that the identified script should be executed, the management service can execute commands, including the referenced command, contained within the executable script. In at least some embodiments, the management service is configured to execute the referenced command before providing the script recommendation to the user device. In such an embodiment, if a message is received indicating that the script should be executed, the management service can execute commands in the script other than the referenced command. In at least some cases, this can reduce the computational resources required to perform system management functions since the commands in the script can be executed directly, instead of receiving and processing multiple subsequent natural language statements from the user device that represent the subsequent commands.

In a different or further embodiment, the management service can determine whether a given user is authorized to execute a given command or script. The management service can determine whether the user has permission to execute the script or command. If the user does not have permission, the management service can request authorization from a supervisor of the given user. Requesting authorization can comprise transmitting a message to a computing device associated with the supervisor, requesting approval for the user's request to execute the command or script. Such a message can comprise one or more natural language statements describing the nature of the request (such as the identity of the given user, the identity of the script or command, identities of any system resources targeted by the script or command, etc.). A reply received from the supervisor computing device can comprise one or more natural language statements, indicating whether or not the request is approved.

FIG. 1 is a system diagram depicting an example system 100 configured to identify executable scripts based on natural language statements. The example system 100 comprises a natural language processor 110 and a system management server 120. The natural language processor 110 can comprise one or more computing devices configured to parse natural language statements and identify executable commands referenced by the natural language statements. Additionally or alternatively, the one or more computing devices of the natural language processor 110 can be configured to generate natural language statements based on commands provided to the natural language processor by other computing devices, such as the system management server 120.

The natural language processor 110 is configured to receive a natural language statement 146. The natural language statement 146 can be received from another computing device via a computer network. The natural language processor 110 is configured to parse the natural language statement 146 and to determine that one or more executable commands are identified by the natural language statement 146. For example, the natural language statement 146 can be a textual or verbal statement provided by a user, requesting that one or more executable commands be executed against one or more target environments 136-138. The natural language processor 110 can be configured to parse such a statement and to determine one or more identifiers 156 for the one or more executable commands referenced by the natural language statement. For example, an identifier for an executable command can comprise a unique name associated with the command (such as a name of a program, service endpoints, executable code component, etc.). In at least some embodiments, an identifier for an executable command comprises additional data referenced by the natural language statement, such as parameter(s) for the executable command and/or target environment(s) for the executable command.

The natural language processor 110 is configured to transmit the one or more command identifiers 156 to the system management server 120. The one or more command identifiers 156 can be transmitted via a network connection or direct connection between the natural language processing 110 and the system management server 120. The system management server 120 is configured to receive the one or more command identifiers 156 and to execute the one or more identified commands 166-168 against the one or more target environments 136-138.

The one or more target environments 136-138 can comprise one or more separate logical computing environments. In at least some embodiments, system resources (such as computing devices, computer hardware components, storage devices, networking devices, etc.) to which the system management server 120 has access are located in separate environments 136-138. Multiple target environments can be associated with separate computer networks and/or subnetworks. In at least one embodiment, one target environment can represent system resources located in a cloud computing environment and another target environment can represent system resources located in an on-premises data center. For example, a given organizational entity can use a cloud computing environment to maintain some system resources, while maintaining some other system resources on-premises. The system management server 120 can be configured to target system resources spread across the multiple environments 136-138 with various executable commands 166-168 that are identified by the one or more command identifiers 156.

The system management server 120 is configured to identify an executable script using the one or more received command identifiers 156. An executable script can comprise one or more files written in a computer programming language, one or more files written in a command-line syntax, one or more files written in a domain specific language, etc. Executable scripts can include interpreting programs, i.e. programs evaluated by a runtime interpreter (such as a programming language interpreter, an operating system shell command interpreter, etc.).

Identifying the executable script can comprise determining that the executable script contains one or more of the executable commands identified by one or more of the command identifiers 156. In at least some embodiments, the system management server 120 is configured to identify a script that begins with the one or more commands identified by the one or more command identifiers 156.

In a scenario where multiple executable scripts are identified, the system management server 120 can be configured to select one of the multiple scripts as a recommended script. Selecting a recommended script can comprise analyzing the multiple scripts to identify a script that is the most likely to be relevant given the one or more received command identifiers 156. Such an analysis can consider a variety of factors, such as how often each of the multiple executable scripts are executed, average execution times of the various scripts, ratings attributed to the various scripts by various users of the example system 100, etc. In at least some embodiments where multiple command identifiers are received by the system management server 120, one of the multiple scripts that begins with a largest number of the commands associated with the received command identifiers, with respect to the other scripts, can be selected as a recommended script. In scenarios where multiple scripts have a same highest-ranking with respect to one criterion, one or more additional criteria can be used to select a recommended script. For example, in a scenario where multiple scripts tie for having a highest relative frequency of execution, one of the multiple scripts that has a fastest relative average execution time can be selected as the recommended script. In a different or further embodiment, multiple scripts can be identified as recommended scripts.

The system management server 120 can be configured to transmit an identifier 158 associated with the recommended script to the natural language processor 110. The natural language processor 110 can be configured to generate a script suggestion 148 based on the script identifier 158. The script suggestion 148 can comprise one or more natural language statements. For example, the script suggestion 148 can indicate that the recommended script begins with one or more of the executable commands referenced by the natural language statement 146 and can suggest that the intent of the natural language statement 146 is to begin an execution of the commands defined in the recommended script.

Optionally, the script suggestion 148 can identify a statement (such as a natural language statement) that can be used to trigger execution of the recommended script. In such an embodiment, the natural language processor 110 can be configured to receive the statement has a selection of the script 148. The natural language processor 110 can be configured to transmit one or more messages to the system management server 120 to cause the system management server 120 to execute the recommended script against the one or more target environments 136-138.

In any of the examples described herein, a natural language statement can be a computer-readable representation of a statement or utterance made using a language naturally spoken by humans (such as English, Chinese, etc.). Natural language statements can be textual and/or verbal. For example, a natural language statement can comprise one or more written sentences encoded using a character encoding (such as Unicode, etc.). Additionally or alternatively, a natural language statement can comprise one or more verbal utterances encoded using an audio encoder (such as a waveform coder, etc.).

In any of the examples described herein, a natural language processor can comprise one or more computer processors configured to parse and analyze natural language statements. In at least some embodiments, a natural language processor can comprise a distributed computing system comprising multiple computing devices connected by a computer network. A natural language processor can be configured to use language processing techniques (such as tokenization, part-of-speech tagging, semantic analysis, machine learning, artificial intelligence (including constructs like neural networks or the like), etc.) to identify and process a request embodied in one or more natural language statements. In at least some embodiments, a natural language processor can comprise an API that can be used to transmit a natural language statement to the natural language processor and to receive a data structure in response that describes a subject and/or intent of the natural language statement. In at least some of the examples described herein, a natural language processor can be configured to identify one or more executable commands and/or executable scripts referenced by a natural language statement, as well as one or more system resources targeted by the referenced commands and/or scripts. Example natural language processors include AMAZON LEX and the like.

Figure 2:
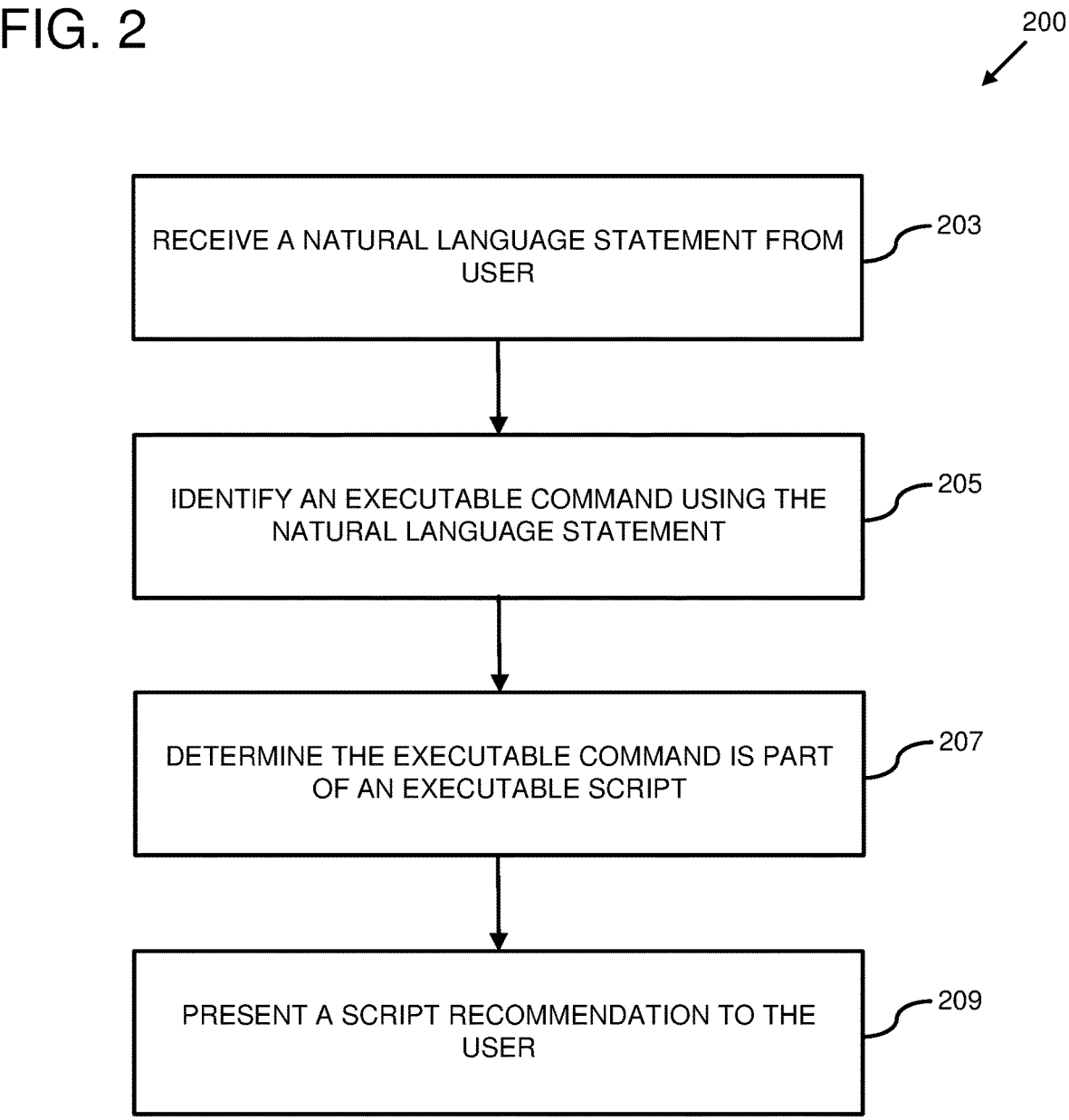
FIG. 2 is a flowchart of an example method for recommending an executable script based on a received natural language statement.

FIG. 2 is a flowchart of an example method 200 for recommending an executable script based on a received natural language statement. Any of the example systems described herein can be used to perform the example method 200.

At 203, a natural language statement is received from a user. The natural language statement can be received, for example, from the user via a computing device connected to a computer network. The natural language statement can comprise one or more sentences input by the user into the computing device via a text entry interface (such as a physical or virtual keyboard) and/or an audio capture interface (such as a microphone).

At 205, an executable command is identified using the natural language statement. Identifying the executable command can comprise parsing the natural language statement using a natural language processor to locate an identifier associated with the executable command that is referenced by the natural language statement. For example, the natural language statement can comprise a request to perform one or more operations targeting the system resource in a given computing environment. The natural language statement can be parsed to identify the requested operations and to correlate the requested operations to one or more executable commands that can be used to target the identified system resource in the target computing environment.

At 207, it is determined that the executable command is part of an executable script. The executable script, when executed can perform one or more operations that target one or more computing resources in a given computing environment. For example, the executable script can be a script of commands that, when processed by a script interpreter (such as a programming language runtime, a domain specific language interpreter, an operating system shell command interpreter, or the like), causes the commands in the script to be executed by one or more computer processors. Executed scripts can be stored in one or more storage locations where they can be subsequently accessed and searched to determine whether they contain a given executable command. The identified executable script that contains the executable command can then be recommended to the user from whom the natural language statement was received at 203. For example, based on the fact that the given script has been executed previously (or that the script is associated with a priority security vulnerability, etc.), and the fact that it contains the command identified in the received natural language statement, it may be inferred that the intent of the user is to provide a series of natural language statements to perform the commands defined in the executable script. By providing a recommendation of the executable script to the user, the processing of multiple subsequent natural language statements from the user may, in at least some cases, be avoided.

At 209, a script recommendation is presented to the user. The recommendation can be presented to the user, for example, via a computing device from which the natural language statement was received. In at least some embodiments, the recommendation can comprise one or more natural language statements. For example, the recommendation can comprise one or more written sentences presented in the form of textual data and/or one or more verbal statements presented in the form of audio data. The recommendation can identify the executable script and present a suggestion to the user to execute the executable script. Additionally or alternatively, the recommendation can be a recommendation to execute the executable script against a given computing environment, such as a computing environment that is targeted by the executable command that is referenced by the natural language statement received from the user.

In at least some cases, more than one executable script may be identified as containing the given executable command referenced by the received natural language statement. In such cases, the multiple identified executable scripts can be analyzed to determine one of the multiple executable scripts to recommend to the user.

Figure 3:
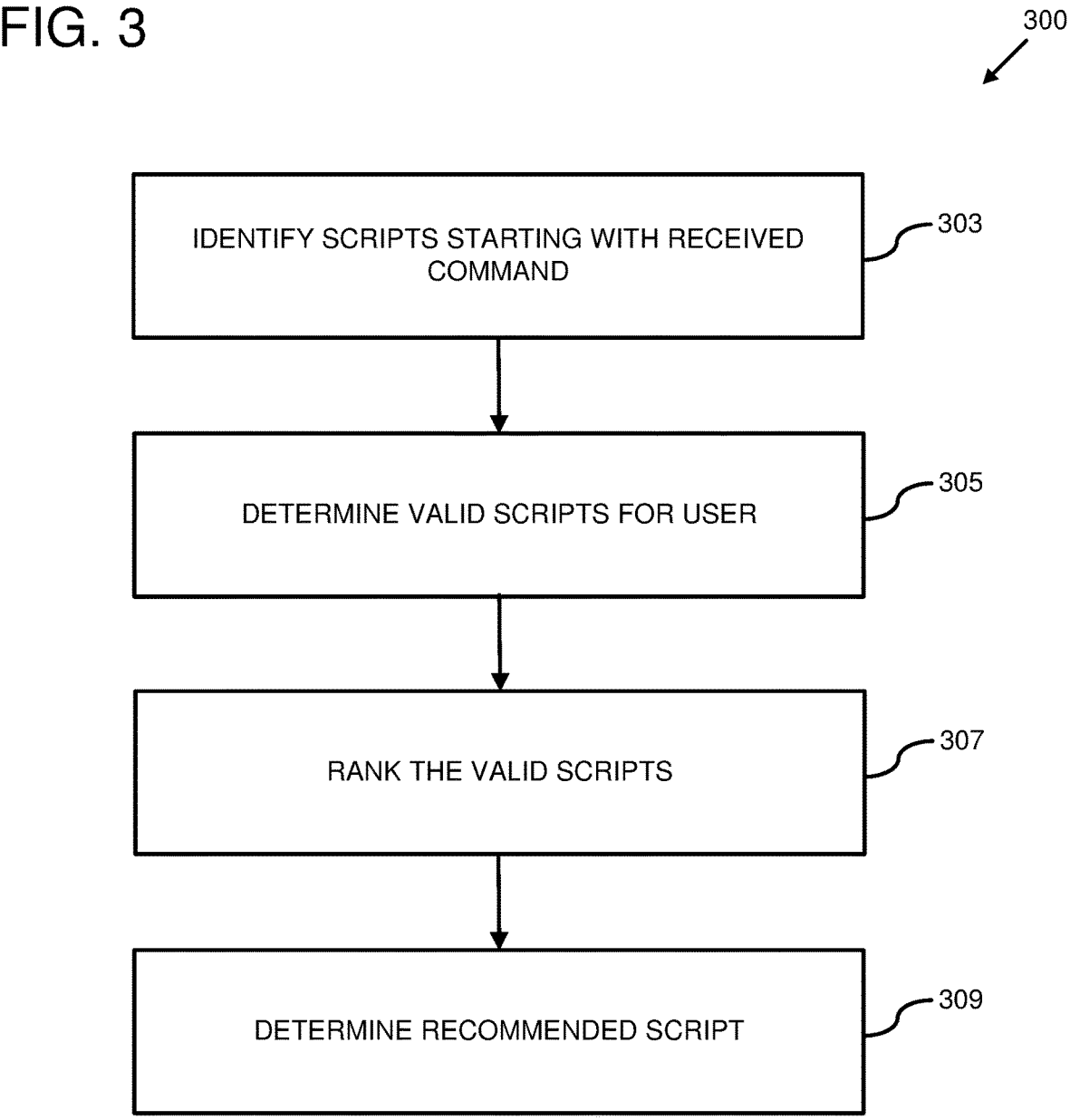
FIG. 3 is a flowchart of an example method for determining a recommended executable script.

FIG. 3 is a flowchart of an example method 300 for determining a recommended executable script. Any of the example systems described herein can be used to perform the example method 300.

At 303, executable scripts are identified that start with a received command. Identifying the executable scripts can comprise searching a repository in which the executable scripts are stored, such as a database, file system, or the like. Executable scripts stored in such a repository can be indexed based on executable commands contained within the executable scripts. For example, when a given script is stored in the repository it can be parsed and indexed based on its contents. Such an index can then be used to identify the executable script by matching search criteria to the indexed contents of the script. In at least some embodiments, positions within a script of various executable commands can be stored as part of the index. In such an embodiment, search criteria can specify the received command as well as an indication that the received command should occur in a starting position within the executable script.

Additionally or alternatively, executable scripts can be stored as character strings. These script character strings can be analyzed to identify which of the strings start with a given sub-string. In such an embodiment, the script character strings can be searched using a sub-string that represents the received command. The sub-string that represents the received command can be a literal string of characters received as part of a parsed natural language statement received from a user. Additionally or alternatively, the sub-string representing the received command can include a regular expression, a templatized string, or the like. For example, particular parameter values for the received command can be replaced with template values (or variable names, etc.) in the sub-string that represents the received command.

At 305, it is determined which of the scripts identified at 303 are valid scripts for a given user. Determining whether a given script is valid for the given user can comprise determining whether the user has sufficient permissions to cause the script to be executed. For example, permissions can be associated with the scripts stored in the repository. When a script is identified as beginning with the received command, permissions associated with the identified script can be analyzed to determine whether the permissions grant the user access to the script. Permission records can be associated with the scripts that indicate that various user identities have various permissions with respect to the scripts. An identity for the given user can be determined and used to retrieve permission records containing the given user's identity that are associated with the identified script. In at least some embodiments, the identity for the given user can be provided with the received command. Additionally or alternatively, the identity for the user can be determined based on aspects of one or more natural language statements received from the user. For example, in an embodiment where the one or more natural language statements received from the user comprise verbal statements represented by audio data, the audio data can be analyzed using voice recognition techniques to determine an identity of the user.

In at least some embodiments, if it is determined that a user does not have sufficient permissions to cause an identified script to be executed, it can be determined whether a supervisor of the given user does have permissions to cause the identified script to be executed. If a supervisor of the given user does have sufficient permissions, the script can be determined to be contingently valid. A contingently valid script can be treated as if it were a valid script for the given user, but with an attached condition that any request received from the given user to execute the identified script must be approved by the user's supervisor.

At 307, the valid scripts are ranked. The valid scripts can be ranked based on various criteria. For example, the ranking can comprise determining frequencies of execution of the scripts. Such frequencies of execution can include frequencies of execution by all users, frequencies of execution by the user for whom the scripts are determined to be valid, and/or frequencies of execution by users that belong to a same organization or entity as the user for whom the scripts are determined to be valid. In at least some cases, the frequencies of execution can be limited to executions against system resources in a target computing environment that is targeted by the received command. These execution frequencies are provided for illustration purposes, other types of script execution frequency metrics are also possible.

Additionally or alternatively, the ranking can comprise determining average (and/or estimated) execution times for the various identified valid scripts. Such execution times can include average (or estimated) execution times for all users, average (or estimated) execution times for the user for whom the scripts are determined to be valid, and/or average (or estimated) execution times for users that belong to a same organization or entity as the user for whom the scripts are determined to be valid. In at least some cases, the execution times can be limited to average (or estimated) times for executions targeting system resources in a computing environment that is targeted by the received command. These example execution time metrics are provided for illustration purposes, other types of script execution frequency metrics are also possible.

Additionally or alternatively, the ranking can comprise determining ratings for the various identified valid scripts. Such ratings can include averages of ratings given by any users, ratings given by the user for whom the scripts are determined to be valid, and/or averages of ratings given by users that belong to a same organization or entity as the user for whom the scripts are determined to be valid. In at least some cases, the ratings can be limited to averages of ratings given for executions of the scripts that targeted system resources in a computing environment that is targeted by the received command. These example rating metrics are provided for illustration purposes, other types of rating metrics are also possible.

Additionally or alternatively, the ranking can comprise determining that one or more of the scripts are associated with a resolution for a security vulnerability. Identified, valid scripts that are associated with a resolution for a security vulnerability can be ranked higher than other scripts. Such security vulnerabilities can include vulnerabilities that are relevant for all computing environments, vulnerabilities that are relevant for a computing environment associated with an organization or entity to which the user belongs, and/or vulnerabilities that are relevant for a target computing environment that is targeted by the received command. A vulnerability can be relevant for a computing environment, for example, if it may impact one or more system resources in the given computing environment.

In at least some embodiments, an intent of the user can be inferred based on one or more natural language statements received from the user (including a natural language statement containing the received command). In such embodiments, scripts that are associated with the same intent can be ranked higher than other scripts that are not associated with the same intent. For example, if natural language statements are received from the user, requesting a current status of one or more system resources in a given computing environment, an inference engine (such as a semantic inference engine, etc.) may be used two determined that the referenced command in the one or more natural language statements is associated with a diagnostic intent for the target computing environment. Scripts that are then identified as being diagnostic in nature can be ranked higher than scripts that are associated with different intents. Such attributes of the various scripts can be stored in metadata associated with the various scripts.

Additionally or alternatively, rankings can be based on relevancy for the received command for a given user. For example, if after providing a same command on several occasions, the given user frequently selects a same script to execute, that frequently selected script can be given a higher ranking in subsequent rankings of valid scripts for the same received command.

At 309, a recommended script is determined. Determining the recommended script can comprise selecting a highest ranked script out of the valid ranked scripts. In at least some embodiments, when more than one script ties for a highest ranking among the ranked scripts, additional ranking criteria can be used to choose one of the scripts as a recommended script. For example, in a scenario where the scripts are ranked based on frequency of execution and multiple scripts tie for a same highest frequency of execution, another criteria (such as execution time, rating, intent, frequency of selection, etc.) can be used to break the tie. Alternatively, when multiple scripts tie for a highest ranking, all of the scripts that match the highest-ranking can be provided as recommended scripts.

In a scenario where one or more of the recommended scripts are contingently valid, an identifier can be provided to indicate to the user which of the one or more recommended scripts are contingently valid. Such information may be helpful to the user in at least some cases since the user will be able to identify which of the one or more recommended scripts requires approval of a supervisor to execute.

Figure 4:
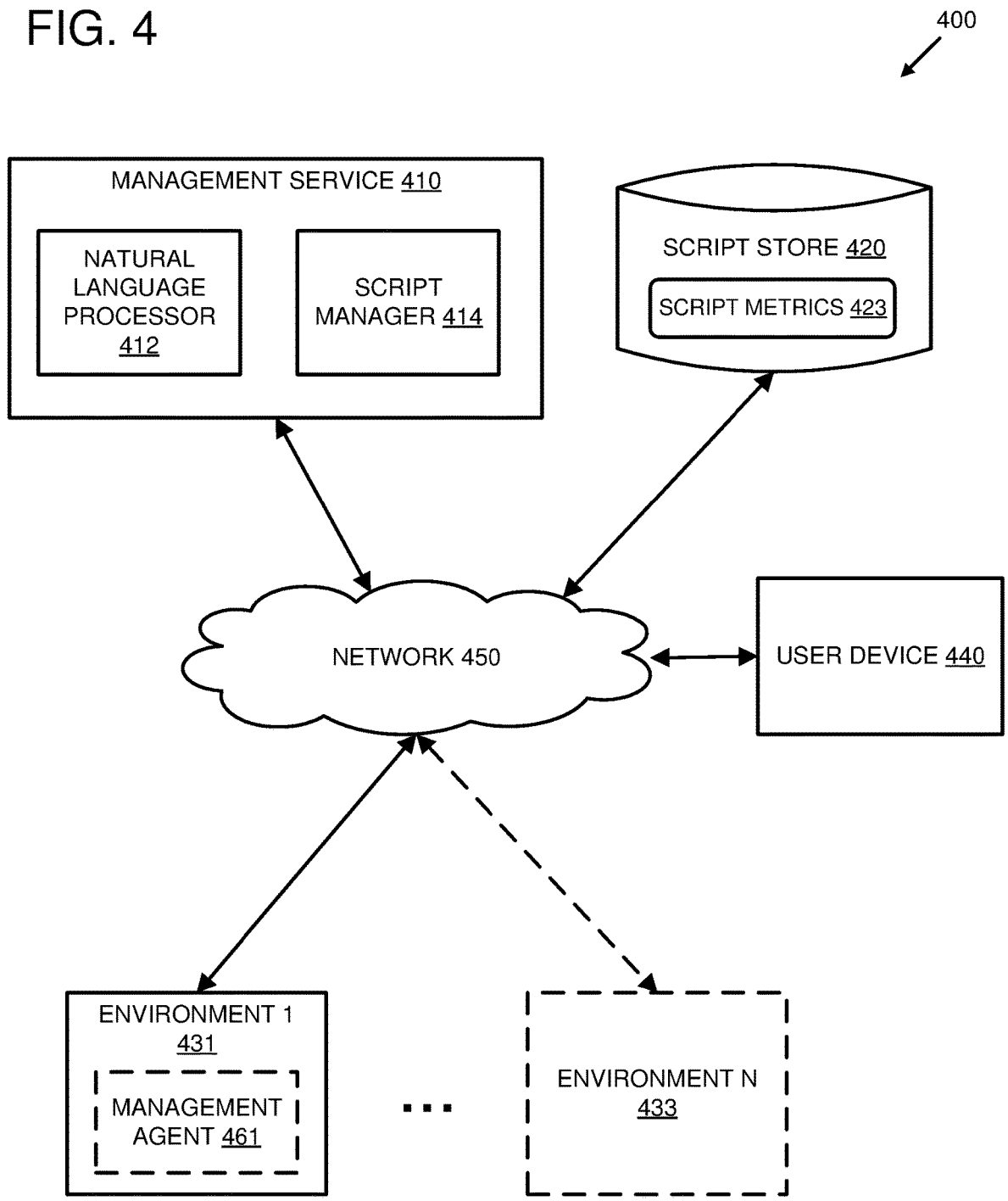
FIG. 4 is a system diagram depicting an example system configured to manage one or more environments using natural language statements.

FIG. 4 is a system diagram depicting an example system 400 configured to manage one or more a computing environments 431-433 using natural language statements. The example system 400 comprises a management service 410 comprising a natural language of processor 412 and a script manager 414. The natural language processing 412 can comprise one or more computing devices. The script manager 414 can comprise one or more of the same or different computing devices. The management service 410 can be configured to expose an API that is accessible by a user computing device 440 via a computer network 450. The computer network 450 can comprise one or more local area networks, wide-area networks, subnetworks, or some combination thereof. In a particular embodiment, the network 450 comprises a local area network containing the management service 410, and another local area network containing the user device 440, wherein the two local area networks are connected via the Internet.

The management service 410 is configured to target system resources (not shown) located in the one or more target computing environments 431-433 via the network 450. The script manager 414 can be configured to access a script store 420 via the computer network 450. The script manager 414 can retrieve one or more executable scripts from the script store 420. The management service 410 can be configured to execute executable commands defined in the scripts against the system resources in the one or more target computing environments 431-433. Additionally or alternatively, the management service 410 can be configured to receive natural language statements from the user device 440 via the computer network 450. The natural language processor 412 can be configured to parse the natural language statements received from the user device 440 and to identify executable commands referenced by the natural language statements. The management service 410 can be configured to execute the referenced commands against system resources in the one or more target environments 431-433. Executing the command against a system resource in a target environment can comprise transmitting the command (or one or more executable operations representing the command) to the system resource via the computer network 450 and processing one or more responses received from the system resource via the computer network 450. In at least some embodiments, commands referenced by natural language statements received from the user device 440, and/or commands defined in one or more of the executable scripts stored in the script store 420, can target multiple system resources located in multiple, separate computing environments of the target computing environments 431-433.

The management service 410 can be configured to identify one or more of the executable scripts stored in the script store 420 that begin with an executable command referenced by natural language statements received from the user device 440. For example, the script manager 414 can be configured to search the script store 420 using the identified executable command, and to retrieve scripts from the script store that begin with the identified command. If more than one script is located that begins with the identified command, the script manager 414 can be configured to rank the executable scripts that began with the identified executable command and to select a highest ranked script, of the executable scripts that begin with the identified executable command. Metrics 423 can be stored in the script store 420 in association with the executable scripts. Script manager 414 can be configured to use the script metrics 423 when ranking the scripts that begin with the identified executable command.

The management service 410 can be configured to transmit a recommendation to the user device 440 to execute the identified executable script that begins with the executable command referenced by the natural language statements received from the user device 440. The management service 410 can be configured to receive a subsequent natural language statement from the user device 440 and to parse the natural language statement to identify a command to execute the identified script. If the received subsequent natural language statement includes the command to execute the identified script, the management service 410 can execute the identified script, wherein the executing the identified script comprises executing one or more executable commands targeting one or more system resources in the one or more computing environments 431-433.

In at least some embodiments, when a natural language statement received from the user device is parsed by the natural language processor 412, and it is determined that the natural language statement references an executable command, the management service 410 can execute the referenced command against one or more system resources in the one or more target computing environments 431-433, and additionally can use the script manager 414 to identify a recommended script in the script store 420 that begins with the referenced executable command. In such an embodiment, when the management service 410 transmits the script recommendation to the user device 440, and receives a subsequent message from the user device 440 indicating that the recommended script should be executed, the management service 410 can execute the remainder of the commands in the identified script that occur subsequent to the referenced command.

Optionally, a target computing environment (e.g., 431) can comprise a management agent (e.g., 461). The management agent 461 can be configured to receive messages identifying executable commands and/or executable scripts from the management service 410 via the network 450. The management agent 461 can be configured to execute the commands and/or scripts against one or more system resources in the computing environment 431. The management agent 461 can comprise one or more computing devices (and/or one or more virtual machines, one or more virtualization containers, etc.). In at least some cases, the management service 410 can use the management agent 461 to target system resources in the computing environment 431 with which it cannot communicate directly. For example, when the management service 410 and the computing environment 431 are in separate local area networks (or separate sub-networks), the management agent 461 can serve as an access point by which the management service 410 can interact with system resources for which the management service 410 does not permissions to access directly.

Figure 5:
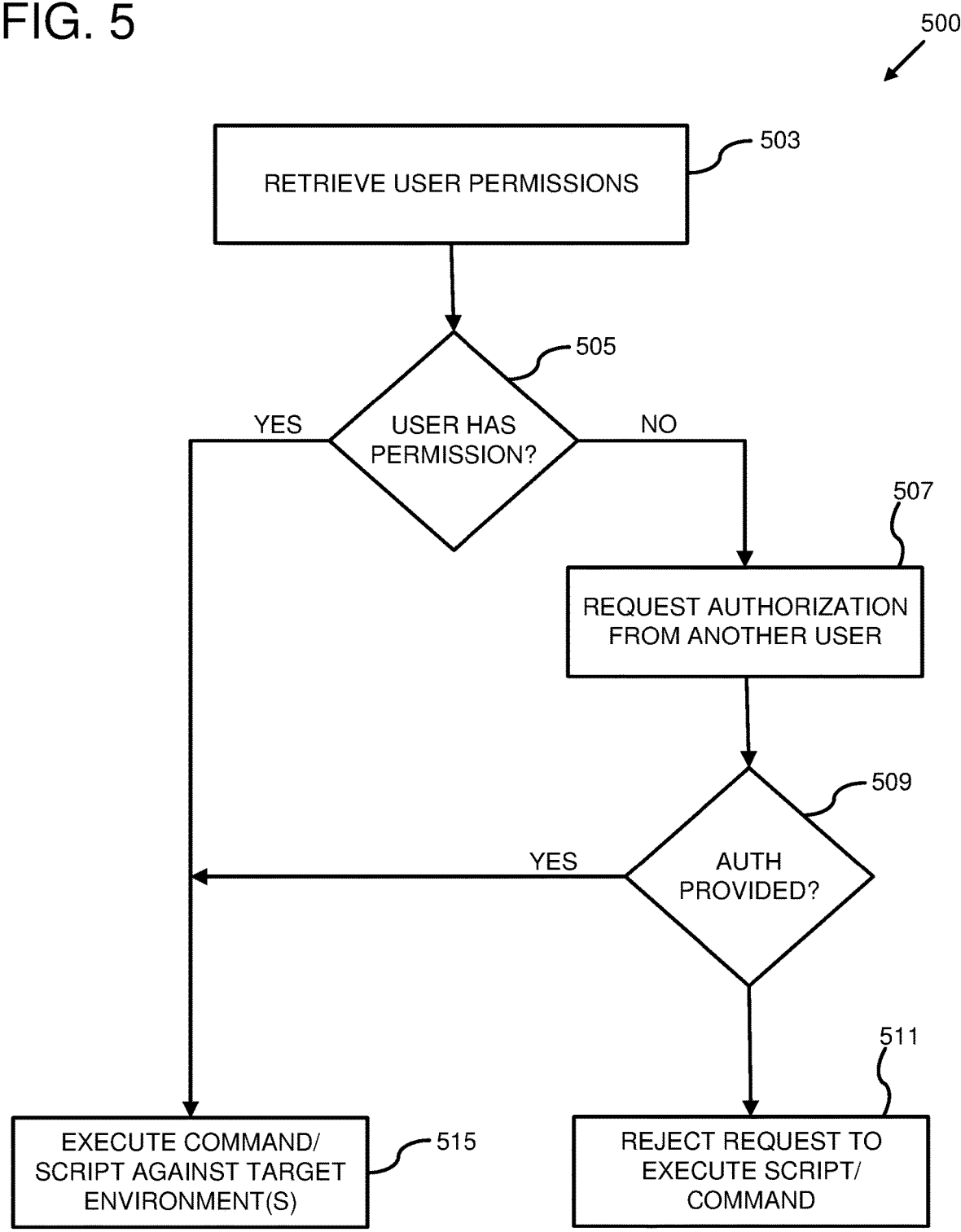
FIG. 5 is a flowchart of an example method for determining whether script execution by a user is authorized.

FIG. 5 is a flowchart of an example method 500 for determining whether execution by a user is authorized. Any of the example systems described herein can be used to perform the example method 500.

At 503, the permissions for a given user are retrieved. The permissions can be, for example, permissions associated with the user and an identified executable command or identified executable script. Additionally or alternatively, the permissions can be permissions associated with the user and one or more system resources targeted by a given executable command and/or executable script. For example, the permissions can indicate whether the user is allowed to execute a given executable command or script and/or whether the user is allowed to access a given system resource. The permissions can be stored in a centralized access repository, such as a repository that supports a lightweight directory access protocol (LDAP) or the like. Additionally or alternatively, the permissions can be embedded in metadata associated with a given executable command, a given executable script, one or more system resources targeted by a given executable command or executable script, etc. In at least some embodiments, the permissions are stored in records in a data store that can be accessed by a computer network.

At 505, it is determined whether the user has permission to execute the identified script or command. Determining whether the user has permission to execute the identified script or command can comprise analyzing the retrieved permissions and determining whether the permissions grant the user access to execute the identified command or script against one or more identified system resources in one or more target environments. In at least some embodiments, at least some system resources are organized in a hierarchical relationship. In such embodiments, at least some permissions applied to parent system resources can be inherited by child system resources. In such embodiments, determining whether the user has sufficient permission to execute the identified command or script against a given resource can comprise traversing a permission hierarchy to determine whether the user has access to a given resource or any parent resource of the given resource.

Additionally or alternatively, default permissions can be applied to the identified executable script or command and/or one or more identified system resources. If specific permissions for the given user are not found, such default permissions can be evaluated instead. For example, a default permission can indicate that a user has access to the identified executable script or command and/or one or more system resources unless specific permissions are applied to prevent the user from having such access. Additionally or alternatively, a default permission can indicate that the given user does not have access to the identified executable script or command, and/or one or more system resources, unless a specific permission grants the user such access.

If the user does not have permission to execute the identified script, at 507, authorization to execute the script is requested from another user that does have permission to execute the identified script. For example, the another user can be a supervisor for the user requesting execution. The supervisor for the user can be identified using an organizational hierarchy that defines multiple levels of authority within an organization. An identity for the given user can be used to look up an identity for another user that is higher in such an organizational hierarchy than the given user and/or that has a supervisory relationship with the given user.

In at least some embodiments, the identity of the user can be provided with a request to execute the identified command or script. Additionally or alternatively, the identity for the user can be determined using voice recognition techniques to isolate a pattern of speech that is unique to the given user within one or more natural language statements received from the user. For example, a natural language statement can comprise one or more audio messages recorded by a user using a computing device. An identity of the user can be determining based on the one or more audio messages.

Additionally or alternatively, the another user can be a user associated with a user group (such as an Active Directory group, or the like) that has the necessary permissions to execute the identified command or script. In at least some cases, the user group can be a system administrator group, a super-user group, or the like.

In at least some embodiments, it can be determined that one or more system resources, for which the requesting user is not an owner, will be affected by the identified command or script. For example, the command or script, when executed, may decommission, shut down, and/or reformat one or more system resources. In such an embodiment, it can be determined that an owner (or owners) of the one or more system resources must approve the execution of the identified script.

Requesting authorization from the another user can comprise transmitting a request for authorization to a computing device associated with the another user. Such a request can identify the executable command or script, the user for whom authorization is requested, and/or one or more system resources targeted by the executable command or script. In an embodiment, where one or more system resources, for which the user is not an owner, will be affected by the command or script, the affected one or more system resources can be identified. In at least some embodiments, the request comprises one or more natural language statements. For example, the request can comprise one or more textual statements identifying the details of the request. Such textual natural language statements can be transmitted to the computing device of the another user as one or more emails, one or more text messages, one or more alert notifications, or the like. Additionally or alternatively, the natural language statements can comprise one or more audio statements identifying the details of the request. Such audible natural language statements can be transmitted to the user computing device as a phone call, a multimedia message, an audio notification, or the like.

In an embodiment where a user group with the necessary permissions is identified, one or more users associated with the group can be notified. For example, all users that belong to the group may be notified. In some cases, all users of the group that are notified must authorize the request. Alternatively, authorization from only one user of the group may be required. In a particular embodiment, the user group is an on-call administrator group with a single member that is an administrative user who is currently on-call.

At 509, it is determined whether authorization is provided by the another user. A message can be received from the computing device of the another user in response to the request transmitted at 507. The response can indicate whether the requested authorization has been granted or denied. In at least some embodiments, the response can comprise one or more natural language statements received from the computing device of the another user. For example, if one or more textual statements are transmitted to the computing device of the another user at 507, the response received from the computing device of the another user can comprise one or more textual statements indicating that the requested access is granted or denied. If one or more audible statements are transmitted to the computing device of the another user 507, the response received from the computing device of the another user can comprise one or more audible statements indicating that the requested access is granted or denied. In a particular embodiment, the request comprises one or more audible statements transmitted to the computing device of the another user as part of a telephone call and the response, indicating whether the requested access is authorized were denied, is received as one or more verbal statements made by the another user as part of the same telephone call.

In at least some cases, a response may not be received from the computing device of the another user (or may not be received within a specified time frame). In such a scenario, a default setting can be used. For example, if the another user is unresponsive, a default determination may be made that the authorization is not provided. Additionally or alternatively, if one user with the required permissions cannot be reached (or cannot be reached within a given time frame), an attempt can be made to identify and notify a second user with the required permissions. For example, in an embodiment where a supervisor of the user is located using an organizational hierarchy, another user that is also in a supervisory relationship with the given user may be located using the organizational hierarchy. In at least some cases, such a user can be a user at a higher level in the hierarchy then the first supervisor of the given user. If another supervisor is identified, another request for authorization can be transmitted to the computing device associated with the another supervisor. In at least some embodiments where a user group with the necessary permissions is identified, if one user of the group is notified and a response is not received (or is not received in the given time frame), another user of the group can be notified.

If it is determined, at 509, that authorization was not provided by the another user then, at 511, the request to execute the identified executable command or script is rejected. Rejecting the request can comprise transmitting a response message to the computing device of the user, indicating that the user does not have sufficient permission and/or that authorization was not provided by another user with the necessary permissions. In at least some embodiments, the response message can comprise one or more natural language statements.

If it is determined at 505 that the user has permission to execute the executable command or script, or it is determined at 509 that the another user authorized execution, then, at 515, the script is executed against the one or more system resources in the one or more target computing environments.

Figure 6:
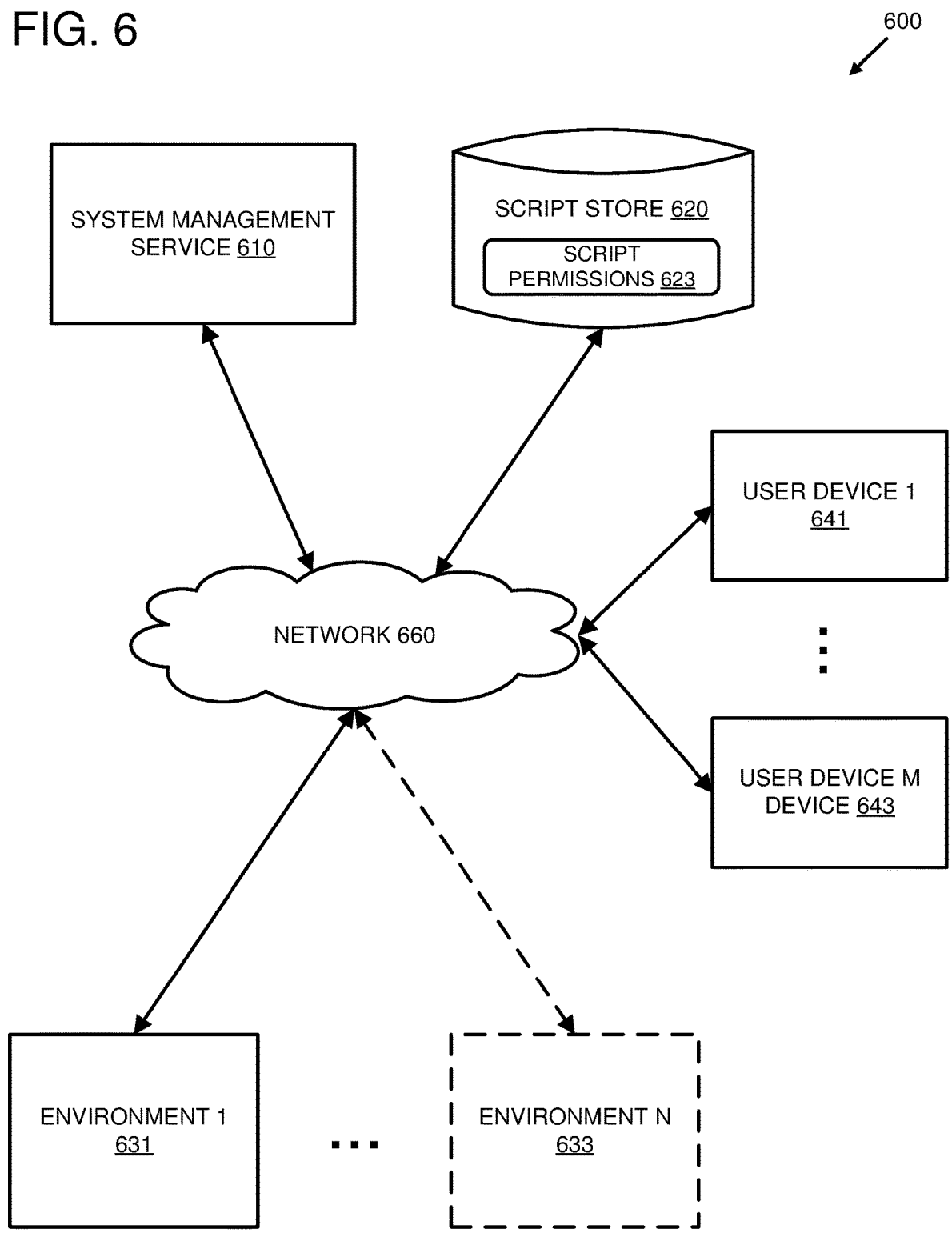
FIG. 6 is a system diagram depicting an example system configured to determine whether script execution is authorized in one or more environments.

FIG. 6 is a system diagram depicting an example system 600 configured to determine whether a command or script execution is authorized in one or more computing environments. The example system 600 comprises a system management service 610, an multiple user computing devices 641-643, that are connected to a computer network 660. The example system 600 further comprises a script store 620 connected to the computer network 660. The script store 620 is configured to store one or more executable scripts (not shown) along with access permissions 623 associated with the executable scripts. The system management service 610 is configured to access the script store 620 via the computer network 660.

The system management service 610 is configured to execute executable commands and/or scripts against system resources located in one or more computing environments 631-633. The one or more computing environments 631-633, in at least some cases, can comprise separate computer networks (and/or subnetworks) connected to the computer network 660. In at least one embodiment, the computer network 660 is a wide area network (such as the Internet) and the system management service 610 and script store 620 are located in a local-area network connected to the wide area network. In such an embodiment, the one or more computing environments 631-633 can be located in the same, and/or separate, local area network(s) connected to the wide area network.

The system management service 610 is configured to receive one or more natural language statements from one or more of the user computing devices (e.g., 641) via the computer network 660. The system management service 610 can parse the received natural language statements to identify one or more executable commands and/or executable scripts referenced by the one or more natural language statements. For example, the system management service 610 can be configured to determine whether a given natural language statement comprises a request to execute an identified executable command or executable script stored in the script store 620. If a given natural language statement received from the user device 641 comprises a request to execute an identified script, the system management service 610 can inspect the script permissions 623 to determine whether the user associated with the user device 641 has sufficient permissions to execute the identified script. Additionally or alternatively, if a given natural language statement received from the user device 641 comprises a request to execute an identified executable command, the system management service 610 can be configured to search the script store 620 for scripts that begin with the identified executable command, and to determine a recommended script, of the identified script that begin with the identified executable command, to suggest to the user associated with the user device 641. In such an embodiment, the system management service 610 can be configured to validate the identified scripts in order to ensure that only scripts which the user has permissions to execute are suggested to the user. Alternatively, if the user does not have permissions to execute a given script that begins with the identified executable command, but a supervisor of the user does have permissions to execute the identified script, the script can be provided as a recommended script to the user along with an indicator that the supervisor's authorization is required in order to execute the recommended script.

If a request is received from the user device 641 to execute an identified script, and it is determined that the user does not have sufficient permissions to execute the identified script, the system management service 610 can determine whether another user (such as a supervisor of the user, one or more members of a user group, one or more owners of system resource(s) affected by the identified script, etc.) has sufficient permissions to perform the requested operations. If another user does have permission to execute the identified script, the system management service 610 can transmit a request for authorization to a computing device associated with the another user (e.g., 643). The request for authorization transmitted to the another user's computing device 643 can comprise one or more natural language statements (such as one or more textual statements and/or one or more audible statements) identifying the user, the script for which execution permission is requested, and/or one or more system resources in the one or more computing environments 631-633 to be targeted by the script.

The system management service 610 can be configured to receive a response from the another user's computing device 643, indicating whether or not the requested authorization is granted. In at least some embodiments, the response comprises one or more natural language statements. In such an embodiment, the system management service 610 can parse the one or more natural language statements (for example using a natural language processor) in order to ascertain the intent of the another user. If the system management service 610 determines that authorization has been granted, the system management service 610 can transmit a message to the user device 641, indicating that authorization has been granted. The system management service 610 can then execute the identified script against the one or more system resources and the one or more target computing environment 631-633. If the system management service 610 determines that authorization is not granted (for example by determining that a response from the another user's computing device 643 rejects the request for authorization, by determining that no response was received from the another user's computing device 643 within an allotted period of time, etc.), then the system management service 610 can transmit a message to the user device 641, indicating that the user's request to execute the identified script is rejected.

Figure 7:
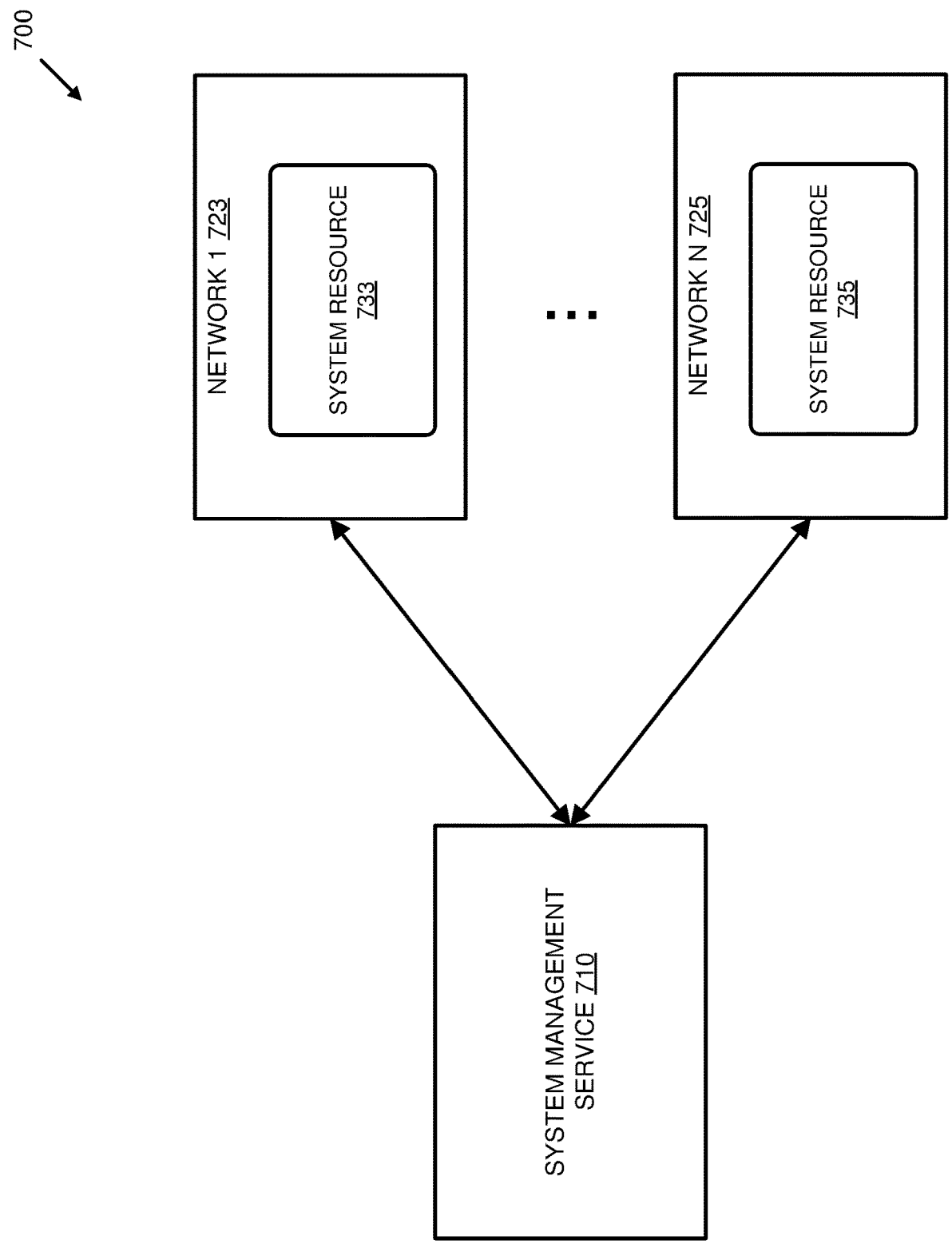
FIG. 7 is a system diagram depicting an example system configured to manage system resources in multiple networks.

FIG. 7 is a system diagram depicting an example system 700 configured to manage system resources in multiple computer networks. The example system 700 comprises a system management service 710 configured to execute executable commands and/or scripts targeting multiple system resources 733-735 located in separate computer networks 723-725.

The system management service 710 can comprise one or more computing devices (such as server computers, etc.) configured to receive messages from user computing devices (not shown) via one or more application programming interfaces. The message is received from the use of computing devices can comprise natural language statements (such as textual and/or verbal statements made by users using the user computing devices. For example, such natural language statements can comprise text messages, phone calls, multimedia messages, or the like. The system management service can be configured to parse the received natural language statements and to identify executable commands and/or executable scripts referenced by the natural language statements. System management service 710 can be further configured to identify system resources, of the system resources 733-735, targeted by the identified executable command or script. The system management service 710 can perform the identified executable command or script, targeting the identified system resources in the separate computer networks 723-725. In at least some cases, a given executable command or script can target multiple system resources in two or more of the computer networks 723-725. In such cases, the system management service 710 can transmit separate commands to each of the identified system resources via the separate networks in which they are located. In at least some embodiments, the separate computer networks 723-725 can represent separate target computing environments, as described herein.

Figure 8:
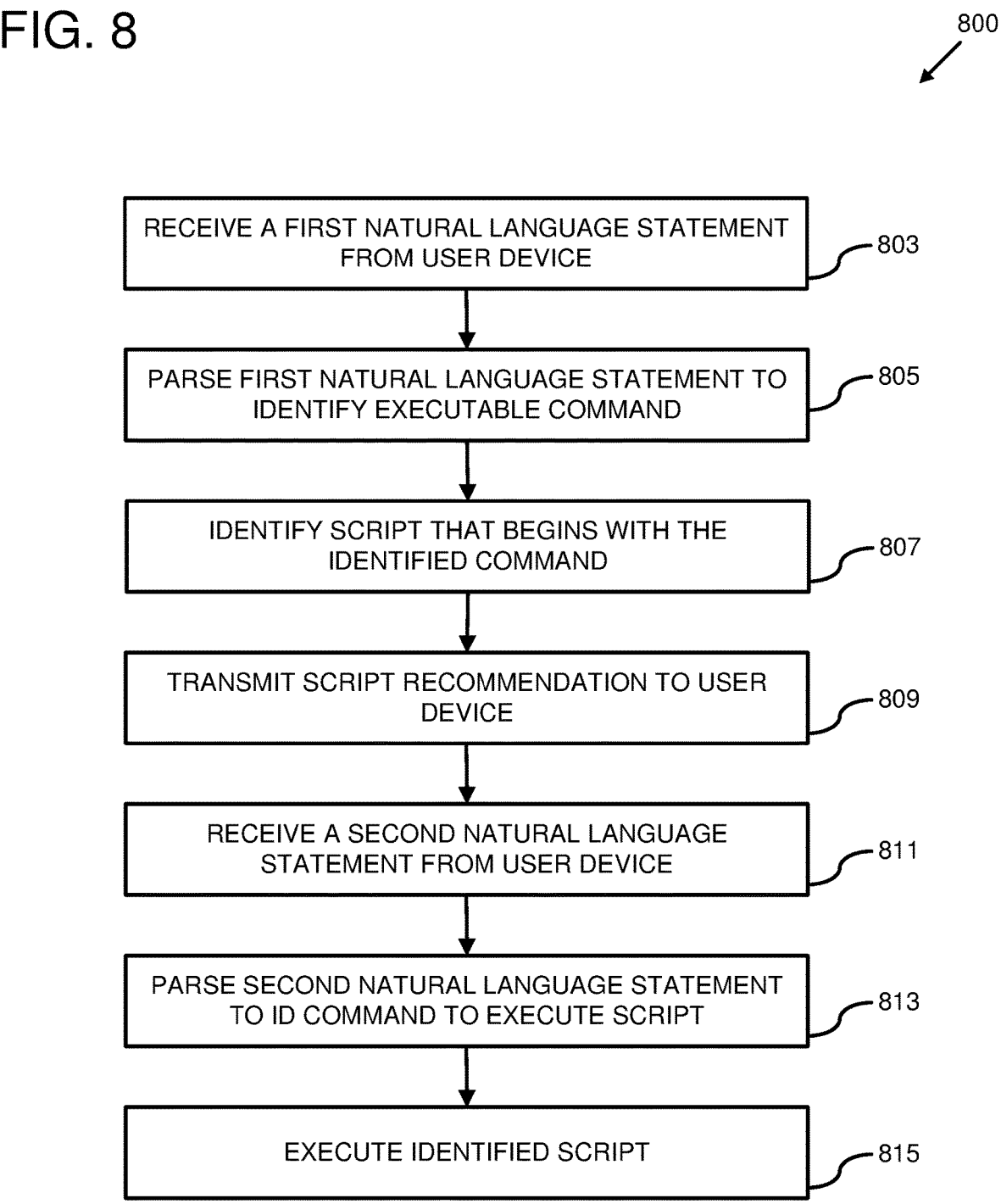
FIG. 8 is a flow chart of an example method for recommending and executing a script using natural language statements.

FIG. 8 is a flow chart of an example method 800 for recommending and executing a script using natural language statements. Any of the example systems described herein can be used to perform the example method 800. In at least some embodiments, the example method 800 can be performed by one or more management servers.

At 803, a first natural language statement is received from a user computing device. At 805, the first natural language statement is parsed to identify an executable command. The parsing can be performed, for example, by a natural language processor. The parsing can further comprise determining that the identified executable command targets a system resource in a computer network. At 807, an executable script is identified that begins with the executable command. In at least some embodiments, the executable script can be identified in a script store, such as a data store storing multiple executable scripts. Identifying the executable script can comprise searching the scripts in the script store for a script that begins with the identified executable command or a templatized version of the executable command. At 809, a recommendation is transmitted to the user device to execute the identified executable script. The recommendation can indicate that the script begins with the command referenced in the first natural language statement and suggest that the intent of a user using the user computing device is to perform the commands defined in the script. At 811, a second natural language statement is received from the user device. At 813, the second natural language statement is parsed. The parsing comprises determining that the second natural language statement references a command to execute the identified script. For example, the natural language statement can reference a generic script execution command and indicate that the identity of the recommended script should be provided as a parameter of the command. Alternatively, the command can comprise an answer to a question posed by the recommendation sent to the user device at 809. For example, the script recommendation can comprise a question, inquiring as to whether the recommended script should be executed and the second natural language statement can indicate an affirmative answer to the question. At 815, the identified script is executed. Executing the identified script can comprise executing one or more commands targeting a system resource in a computer network, including the executable command referenced by the first natural language statement.

Figure 9:
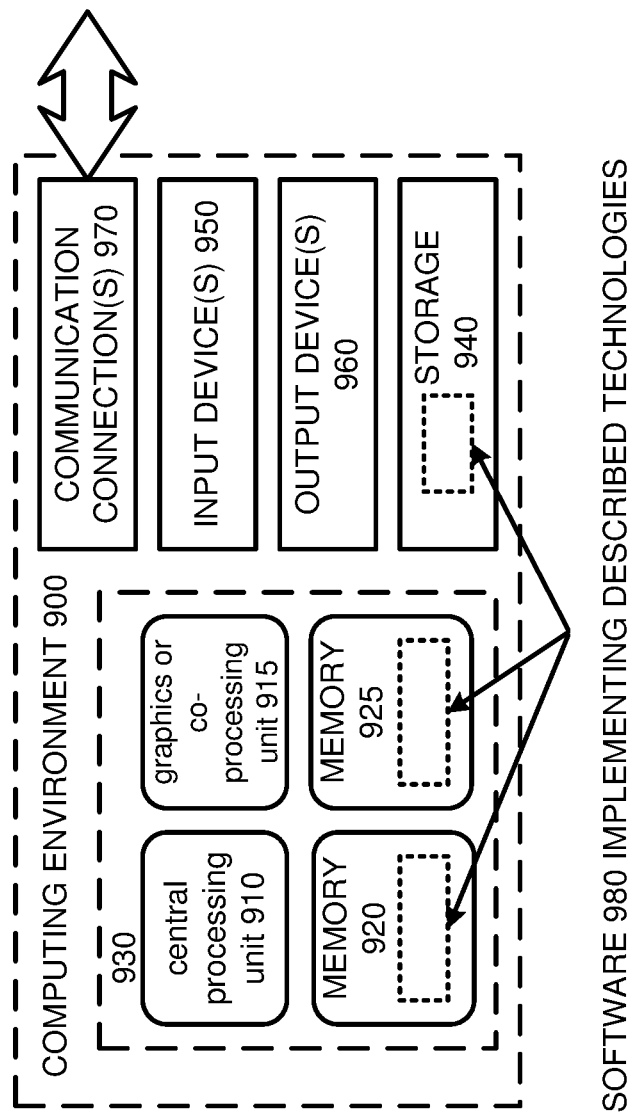
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

In at least some embodiments, the computing environment 900 can be a computing device, a system management server, part of a system management service, or a server as described herein.

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

In some embodiments, the storage 940, input devices(s) 950, output device(s) 960, communication connection(s) 970, and/or the graphics or co-processing unit 915 comprise one or more of the example electronic devices as described herein.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), microprocessors, etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. *The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system, comprising:
 a management server comprising a processor and a memory storing executable instructions that, when executed by the processor, cause the management server to perform operations, the operations comprising:
 receiving a first natural language statement from a user device;

parsing the first natural language statement to identify an executable command targeting a system resource in a computer network;
identifying an executable script in a script store that comprises an executable computer program that begins with the identified executable command and contains other executable commands, wherein identifying the executable script occurs subsequent to identifying the executable command;
transmitting the identified executable script as a recommendation to the user device to execute the identified executable script;
receiving a second natural language statement from the user device;
parsing the second natural language statement to identify a command to execute the identified executable script; and
executing the identified executable script, wherein the executing the identified executable script comprises executing the identified executable command targeting the system resource in the computer network.

2. The system of claim 1, wherein the executing the identified executable script further comprises executing another command targeting another system resource in another computer network.

3. The system of claim 1, wherein the identifying the executable script comprises:
searching the script store for executable scripts that comprise executable computer programs that begin with the identified executable command;
ranking the executable scripts that comprise executable computer programs that being with the identified executable command; and
selecting a highest ranked script of the executable scripts that begin with the identified executable command.

4. The system of claim 1, wherein the operations further comprise:
determining whether a user is authorized to execute the identified executable script.

5. The system of claim 4, wherein determining whether the user is authorized comprises:
transmitting a request for authorization to a supervising user device;
receiving a natural language statement from the supervising user device; and
parsing the natural language statement from the supervising user device to identify a command authorizing execution of the identified executable script.

6. A method, comprising:
receiving a natural language statement at a computing device from a user;
identifying an executable command using the natural language statement;
determining that the executable command is part of an executable script comprising an executable computer program that includes the executable command and other executable commands wherein determining that the executable command is part of the executable script occurs subsequent to identifying the executable command;
presenting the executable script as a recommendation to execute the executable script against the computing environment to the user;
receiving a second natural language statement at the computing device from the user;
parsing the second natural language statement to identify a request to execute the executable script; and
executing the executable script that, when executed, performs an operation targeting a computing resource in a computing environment, wherein executing the executable script comprises executing the executable command and the other executable commands.

7. The method of claim 6, further comprising:
identifying multiple executable scripts that comprise executable computer programs starting with the executable command;
ranking the multiple executable scripts; and
selecting one of the ranked executable scripts as a recommended executable script.

8. The method of claim 7, wherein the ranking the multiple executable scripts is based on a frequencies of execution of the multiple executable scripts.

9. The method of claim 7, wherein the ranking the multiple executable scripts is based on execution times of the multiple executable scripts.

10. The method of claim 6, wherein the executing the executable script comprises executing the executable command against a server in the computing environment.

11. The method of claim 10, wherein the executing the executable script further comprises executing another executable command against another server in another computing environment.

12. The method of claim 6, further comprising:
determining whether the user is authorized to execute the executable script.

13. The method of claim 12, wherein the determining whether the user is authorized to execute the executable script comprises:
transmitting a notification to a computing device of a supervisor of the user, requesting approval to execute the executable script; and
receiving a message from the computing device of the supervisor, approving the execution.

14. The method of claim 13, wherein:
the notification comprises a natural language statement; and
the message received from the computing device of the supervisor comprises another natural language statement.

15. A system, comprising:
a natural language processor configured to:
receive a natural language statement from a user device via a computer network,
identify an executable command referenced by the natural language statement,
transmit an identifier for the executable command to a management server,
receive an identifier for an executable script containing an executable computer program that contains the executable command and other executable commands from the management server, and
transmit a script suggestion, comprising the identifier for the executable script, to the user device via the computer network;
receive another natural language statement from the user device,
determine that the another natural language statement comprises a request to execute the executable script,
transmit a request to execute the executable script to the management server; and
the management server, configured to:
receive the identifier for the executable command from the natural language processor,
execute the executable command, identify the executable script containing the executable computer program that contains the executable command and other executable commands, wherein identifying the executable script occurs subsequent to executing the executable command, transmit the identifier for the executable script to the natural language processor, receive the request to execute the executable script from the natural language processor, and execute the other executable commands of the executable script, wherein executing the other executable commands comprises performing an operation targeting a computing resource in a computing environment.

16. The system of claim 15, wherein identifying the executable script comprises:

searching for executable scripts that comprise executable computer programs that begin with the executable command;

ranking the executable scripts based on a frequency of execution; and selecting an executable script, of the executable scripts, that has a highest frequency of execution, of the ranked executable scripts.

17. The system of claim 15, wherein:

the natural language statement comprises an audio message provided by a user using the user device;

the natural language processor is further configured to determine an identity of the user based on the audio message; and the management server is further configured to determine that the user is authorized to execute the executable command.

* * * * *

UNITED STATES PATENT AND TRADEMARK OFFICE
CERTIFICATE OF CORRECTION

PATENT NO. : 11,100,146 B1
APPLICATION NO. : 15/933849
DATED : August 24, 2021
INVENTOR(S) : Brest et al.

Page 1 of 1

It is certified that error appears in the above-identified patent and that said Letters Patent is hereby corrected as shown below:

In the Claims

Column 19, Line 32, "programs that being with" should read --programs that begin with--.

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*